Nov. 21, 1961  B. A. GRUBER  3,009,230

PROCESS OF STABILIZING BORON PHOSPHIDE AND RESULTANT ARTICLE

Filed April 16, 1958

BORON PHOSPHIDE

REACTION PRODUCT OF BORON PHOSPHIDE WITH OXYGEN

BORON PHOSPHIDE

REACTION PRODUCT OF BORON PHOSPHIDE WITH OXYGEN

INVENTOR.
Bernard A. Gruber
BY Herman O. Bauermeister
Attorney

United States Patent Office 3,009,230
Patented Nov. 21, 1961

3,009,230
PROCESS OF STABILIZING BORON PHOSPHIDE AND RESULTANT ARTICLE
Bernard A. Gruber, Dayton, Ohio, assignor to Monsanto Chemical Company, St. Louis, Mo., a corporation of Delaware
Filed Apr. 16, 1958, Ser. No. 728,805
12 Claims. (Cl. 25—157)

The present invention relates to a new method for stabilizing boron phosphide against deterioration at very high temperatures under oxidizing conditions. The invention also relates to a new combination of boron phosphide with a protective coating integrally bonded therewith.

It is an object of the invention to improve boron phosphide which is a well crystallized, hard and thermally stable material. The boron phosphide may be subjected to very high temperatures, such as temperatures of from 2,800° F. to 5,000° F. without substantial alteration or deterioration of the said boron phosphide. However, it has been found that when boron phosphide is slowly heated to a high temperature and is subjected at an intermediate range of such heating step to oxidizing influences, a certain amount of oxidation and/or degradation of the said boron phosphide occurs. It is possible by suitable design expedients to utilize boron phosphide in various high temperature fields of use, for example as a combustion zone construction material or lining material. An expedient in this instance is to operate the combustion of a jet or missile fuel in such combustion zone by maintaining a reducing atmosphere. In this way the boron phosphide is protected at both intermediate and high temperatures and thus permits operation over any necessary range of operating temperatures.

It is desirable, however, to protect and stabilize articles of manufacture formed from boron phosphide which must be subjected to both an oxidizing atmosphere and a high temperature.

It has now been found that articles formed of boron phosphide may be stabilized against oxidative deterioration by first subjecting such boron phosphide articles to an oxidation treatment at a temperature above 3,600° F., and preferably from 3,600° F. to 5,000° F. The time of treatment is not critical and it has been found that the desirable stabilization may readily be achieved by conducting such preliminary oxidation for a period of time of from 15 seconds to 30 minutes. It is found that crystalline boron phosphide objects treated in this way are oxidation-resistant in the critical temperature range which broadly extends from 1,800° F. to 3,300° F., and particularly from 2,000° F. to 2,500° F., even though untreated samples suffer oxidative degradation in this temperature range.

The exact mechanism of the present stabilization treatment has not been completely elucidated. There is a possibility that the treatment of boron phosphide at temperatures above 3,600° F. in the presence of an oxidizing agent such as air, oxygen or oxygen enriched air, brings about a transformation to oxidized boron and phosphorus compounds, such as boron phosphate, pyrophosphates, etc. However, it has been found that regardless of the chemical mechanism, the coating thus produced accomplishes a highly useful result.

The drawing which forms a part of the present patent application illustrates two specific embodiments of the present invention.

Figure 1:
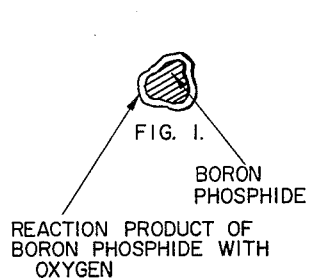
FIG. 1 illustrates a cross-section of a particle of crystalline boron phosphide having an external glaze which protects the interior of the said particle against oxidation, and thereby constitutes a particle of stabilized crystalline boron phosphide.

The stabilization process of the present invention also contemplates the addition of regulated proportions of specific stabilizing agents to the crystalline boron phosphide which is to be heated as described above. It has been found that a component selected from the group consisting of boron, potassium, sodium, magnesium, barium, calcium, silicon, chromium, molybdenum, aluminum, zirconium, titanium, and the oxides of potassium, sodium, magnesium, barium, molybdenum, aluminum, zirconium, titanium, hafnium, thorium and beryllium, as well as combinations thereof are of utility in this relationship. A preferred group of stabilizers include elemental boron as well as the oxides of potassium, sodium, magnesium and beryllium.

It has been found that the said stabilizing agents aid in the formation of an external coating which at high temperatures is fluid on the surface of the crystalline boron phosphide, such fluid coating aiding in the solution of oxidative products. For example, if the crystalline boron phosphide or the oxidation products thereof undergo a phase change in the critical temperature range of from about 2,000° F. to 2,500° F. under oxidizing conditions with the formation of numerous oxidation products including boron phosphate, the stabilizing components form a glaze in which the oxidation products are dissolved. This glaze is stable against devitrification when the material is cooled, thus insuring the presence of glassy external layer on the individual particles of treated crystalline boron phosphide, or at the external surface of fabricated articles of crystalline boron phosphide. Potassium oxide has been found to be particularly useful in forming a wide range of stable glasses with boron oxides, phosphorus oxides, and potassium oxides. Such glasses form an integrally bonded stabilizing layer which protects the crystalline boron against oxidation in the critical temperature range.

The proportion of the said stabilizing agent employed in this relationship may be in the range of from 1% to 60% by weight relative to the weight of the boron phosphide. A preferred range is from 1% to 20%, in which range of proportions the optimum corrosion and degradation inhibition is obtained.

It is often desirable, however, to employ relatively large proportions of the stabilizing agent, for example from 20% to 60% by weight in order to aid in the fabrication of the stabilized crystalline boron phosphide. For example, it has been found that discrete particles of crystalline boron phosphide (approximately 100–325 mesh) when mixed with 30% by weight of elemental boron or silicon are readily transformed by heat fusion into any desired shape, for example a flat plate or a solid nose cone intended for use in a guided missile. Because of the addition of the specific stabilizing components described herein the mixture is readily fused and sintered at a temperature of about 2,800° F. to 4,000° F. to obtain a shaped article in which the particles are interlocked by the fusing interaction of the elemental silicon or boron, the latter also being available within the boron phosphide subjected to heating and oxidation which may volatilize off phosphorus to leave boron or boron compounds.

An additional advantage of such fabrication method when using silicon is that the external skin of the article when heated in the presence of air forms a glassy layer of silica, resulting from the oxidation of the silicon. In the more general group of stabilizing components described above, such oxidation of the metals to the oxides occurs in a similar manner, for example, in the employment of aluminum, a certain amount of alumina is thus formed.

The provision of an additional oxide, such as silica is also advantageous in the fabrication of shaped articles of crystalline boron phosphide. This advantage is particularly obvious when the shaped article must undergo abrasion such as by the impingement of finely-divided particles or a rapidly flowing stream of air or other gases at high temperatures. The presence of the silica as a coating on the individual particles with the silica being added per se, or by oxidation of silicon (added as the metal) at the external surface of the fabricated articles results in a migration of the silica, and silicon to the exterior of the article as abrasion wears away the outer surface. The result of such migration is the continuous formation of silica at the surface, which also provides for a self-healing effect, since the silicon is transformed into the high temperature, stable crystobolite modification. The silicon diffuses into cracks and crevices and upon oxidation expands therein to seal off the interior against porosity.

The objects obtained by the process of the present invention also constitute a step forward in the development of thermally stable refractories and abrasive materials. The stabilization treatment results in the development of a surface coating which is similar to a surface glaze and which is integrally bound and connected by inter-crystalline bonds to the interior portion of the boron phosphide object. The thickness of the protective layer may be varied somewhat by regulating the time of exposure to the oxidizing conditions and by the use of higher temperatures, both of which factors increase the thickness of the surface coating.

It is also contemplated that the present protective treatment may be employed on finely-divided boron phosphide particles. For this method the said boron phosphide may be spread out in a relatively thin layer so that the oxidizing agent, for example oxygen-enriched air quickly penetrates throughout the entire mass. This treatment may be carried out in a conventional type electric furnace, or particularly in large scale operations may be conducted by a fluidization method in which the particles are subjected to a hot gas containing oxygen. Another method of accomplishing this object is to employ a moving bed reactor system in which the desired temperature of from 3,600° F. to 4,500° F. is maintained in the high temperature reactor.

The introduction of air or an oxygen-enriched gas stream, optionally also with a combustion gas such as hydrogen or natural gas, makes it feasible to achieve the desired high temperature as well as to control the time of the stabilization treatment. The boron phosphide particles thus obtained have a surface-stabilized coating of the glassy protective layer which is also of utility as a bonding agent in the fabrication of mechanical parts from the crystalline boron phosphide. This is of advantage in the use of a sintering technique or a hot pressing or cold pressing method for the fabrication of chemical vessels, grinding wheels, nose cones for missiles, etc. from the crystalline boron phosphide. The products thus obtained are characterized in having the protective layer dispersed throughout the mass of the crystalline boron phosphide, thus greatly improving the oxidative resistance of the fabricated part in the critical temperature region of from 2,000° F. to 2,500° F.

The reason for the decreased oxidative stability of crystalline boron phosphide in the temperature region of from 2,000° F. to 2,500° F. is not definitely known, but it would appear likely that a phase transformation of some kind may occur in the oxidation products of the crystalline boron phosphide, and elemental residual boron or boron compounds in this temperature region. For example, while the specific oxidation products have not been completely elucidated it would appear possible that a minor proportion of boron phosphate which may contain various boron oxides and phosphorus oxides results from oxidation in the intermediate temperature region. At higher temperatures such as are encountered in an oxyacetylene flame, such oxidation products, as well as dissolved inorganic materials, apparently are characterized by a stable structure which resists oxidation by the atmosphere, oxygen gas or inorganic oxidizing agents, such as perchlorates and perborates. However, in the critical medium temperature region certain phase changes may occur as well as possible precipitation or surface migration of incompletely characterized oxides and other inorganic compounds. However, it has definitely been ascertained that the present method of subjecting crystalline boron phosphide to stabilization by an oxidation treatment at a temperature above 3,600° F., preferably from 3,600° F. to 5,000° F. for a period of time of from 15 seconds to three minutes results in a protective coating or stabilization of the boron phosphide. Such stabilized material is thereafter found to resist the deteriorative effects of oxidation in the medium temperature region of from 2,000° F. to 2,500° F.

It is found that surface-stabilized boron phosphide has a glazed exterior layer which may vary in thickness from 0.0005″ to 0.005″, depending upon the size of the particles and the time and temperature of treatment. This stabilized material is advantageously employed in hot pressing and cold pressing of the crystalline boron phosphide to obtain various shaped pieces, since the stabilizing layer also aids in the bonding and consolidation of the individual particles into the desired shaped piece.

The following examples illustrate specific embodiments of the present invention:

*Example 1*

A cylindrical rod of crystalline boron phosphide was subjected to a thermal stabilization treatment by directing an oxyacetylene flame, which was rich in oxygen at the rod for a period of two minutes. The temperature at the surface of the cylindrical rod was approximately 4,000° F. It was found that a finely-glazed surface was developed upon the rod. In order to test the oxidation resistance of this coating, the test piece was placed in a furnace at 2,000° F. for a period of 15 minutes under ordinary atmospheric conditions. It was found that the test rod was unaffected by this oxidation test, whereas an untreated piece similarly tested in the furnace was found to be severely oxidized and pitted with the development of a white, crystalline exterior layer composed of various oxidation products.

*Example 2*

Stabilized particles of crystalline boron phosphide were prepared by charging 100 g. of −100 mesh crystalline boron phosphide into a $ZrO_2$ dish. The mass of particles was subjected to an oxygen acetylene torch maintained with an oxygen-rich oxidizing flame. The period of treatment was about 30 seconds employing a sample temperature of about 4,000° F. This individual particles had an external glaze which was about 0.0005 inch thick. A cross-sectional view of such a particle is shown in FIG. 1, which is not drawn to scale in order to show the exterior layer more clearly. The individual particles were found to be stable against oxidation in the critical temperature range of from 2,000° F. to 2,500° F., while a comparison test showed that untreated samples suffered serious oxidative degradation in this temperature range.

Example 3

Figure 2:
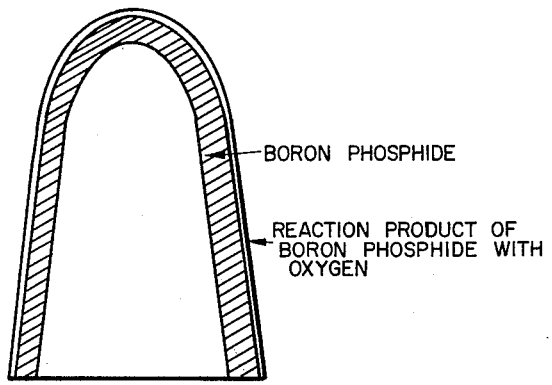
FIG. 2 illustrates a cross-section of a nose cone for a rocket or guided missile. This nose cone is formed from crystalline boron phosphide which has been stabilized by the process of the present invention whereby an external glaze is formed to protect the body of crystalline boron phosphide from oxidation in the critical temperature range of from 2,000 to 2,500° F.

The formation of a stabilizing layer on a curved-shaped article of crystalline boron phosphide is shown in the present example. A missile nose cone was fabricated from crystalline boron phosphide by a pressing-sintering technique in which the particles were shaped into the desired form by hot pressing at a temperature of about 3,600° F. In order to stabilize the nose cone against oxidative deterioration in the critical temperature range of 2,000° F. to 2,500° F., the fabricated article was exposed to a strongly oxidizing flame until the surface reached a temperature of about 4,000° F. for a period of about 2 minutes. The cone was then cooled. Upon being tested by exposure to oxidizing conditions at 2,000° F., the stabilized article was found to resist oxidation and to show no substantial deterioration despite prolonged heating at this temperature in the presence of atmospheric oxygen. A cross-sectional view of the stabilized nose cone is shown in FIG. 2 (not drawn to scale).

Example 4

Figure 3:
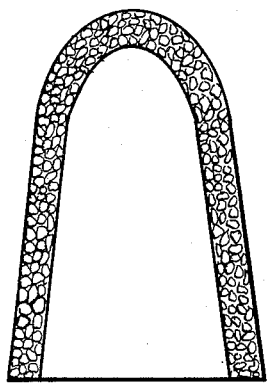
FIG. 3 illustrates in cross-sectional view how a nose cone may be formed from individual particles such as are shown in FIG. 1 to provide a body which is stabilized both externally and internally against oxidation in the aforesaid critical temperature region.

The stabilized boron phosphide particles described in Example 2 were fabricated into a nose cone having the shape shown as a cross-sectional view in FIG. 3. The method of fabrication in this instance was hot pressing in which the mass of particles were placed between two complementary dies formed of graphite. The dies with the intermediate layers of stabilized boron phosphide was then heated to a temperature of 3,000° F. for about one hour. The entire assembly was then cooled and the die separated in order to remove the fabricated nose cone. This article of stabilized crystalline boron phosphide was resistant to oxidizing in the critical temperature range of from 2,000° F. to 2,500° F.

Example 5

A discrete crystalline particulate form of boron phosphide having a size range of from 100–325 mesh was mixed with 30% by weight of metallic silicon. This mixture was subjected to a thermal stabilization treatment by directing an oxy-acetylene flame which was rich in oxygen at the mixture for a period of two minutes. The temperature of the mixture was approximately 4,000° F. It was found that a finely-glazed surface was developed on the individual particles. In order to test the oxidation resistance of this glassy coating, the sample of the stabilized material was placed in a furnace at 2,000° F. for a period of 15 minutes under ordinary atmospheric conditions. It was found that the test particles were substantially unaffected by this oxidation test, whereas untreated material similarly placed in the furnace was found to be severely oxidized and pitted with the development of a white crystalline exterior layer composed of various oxidation products.

Example 6

The stabilization of a shaped object formed from crystalline boron phosphide was carried out utilizing potassium carbonate as the initial material for stabilization, since this compound is transformed into potassium oxide at high temperatures. A rod of crystalline boron phosphide was dipped into an aqueous suspension of potassium carbonate to yield about 1% by weight of equivalent potassium oxide, relative to the weight of the rod. The coated rod was placed upright in a holder which was charged to an electric furnace. The rod was heated in an atmosphere of air until the surface temperature of the sample reached 4,000° F. The treated object was then removed from the furnace and was found to have developed a glazed external surface. The stabilized article was tested for oxidation resistance by again being heated in a furnace at 2,000° F. for a period of 15 minutes under ordinary atmospheric conditions. It was found that the test piece was substantially unaffected by this oxidation test, whereas untreated samples similarly located in the furnace were found to be severely oxidized and pitted because of oxidation at this temperature.

The stabilized form of crystalline boron phosphide is of particular utility in the fabrication of various shaped objects, particularly objects having curved sections. It is an advantage of the present product that an external glaze or layer is formed on the prefabricated article of crystalline boron phosphide. This glaze shrinks slightly during cooling, thereby stressing the exterior of such articles and forming an inter-growth bond between such exterior glassy and the interior crystalline portion of such objects.

When it is desired to employ the above bonding agents as a corrosion inhibiting or stabilizing agent, the proportion employed may range from 1% to 60% by weight of such stabilizer. It has been found that the employment of relatively high proportions, for example from 20% to 60% by weight of the additive agent makes it possible to form shaped articles from the particulate crystalline boron phosphide admixed with the particulate stabilizing agent without the necessity of high pressures, for example by utilizing atmospheric pressure or relatively low pressures such as from 1 to 50 pounds per square inch. This method of fabrication begins with the mixing of the particulate components which are then shaped into the desired form, for example as a flat plate suitable for use as a wear plate or as a solid or hollow nose cone. The shaped article which may be formed in a ceramic or graphite mold is then heated to a forming temperature, such as from 1,000° F. to 4,000° F. for a sufficient time to consolidate the particulate mixture and effect the consolidation of the crystalline boron phosphide with the bonding agent. Another embodiment of this process is to employ an augmented proportion of the stabilizing agent, for example metallic silicon or silica at the exterior surface of the shaped article. If it is desired, the exterior portion of the shaped body may be formed with pure crystalline boron phosphide particles with the stabilizing components, such as elemental silicon being utilized only at the exterior as a protective layer. The heat formation of the desired article then fuses the entire mass of particles into the desired shape. The silica, or the silica resulting from the oxidation of silicon by the atmosphere in such formation process develops an external glassy layer in which a minor proportion of the boron phosphide or oxidation products thereof resulting from the critical range heating (in the temperature range of from 2,000° F. to 2,500° F.) brings about the production of oxidative deterioration products such as boron phosphate. Any such corrosion products are dissolved in the stabilizing agent which thus forms a protective layer at the exterior of the shaped piece. This stabilized layer then makes it possible to heat the fabricated article for prolonged periods of time in the critical temperature range of 2,000° F. to 2,500° F. without serious oxidative degradation.

The improved stabilized cubic crystalline form of boron phosphide is characterized by unusually high temperature stability. It has been found that this material may be subjected for brief periods to temperatures of about 5,000° F. This material is also resistant to attack by any known liquid chemical reagents, including the mineral acids, for example, sulfuric acid, hydrochloric acid and fuming nitric acid, as well as basic materials such as caustic and hydrazine. Aqua regia does not attack the stabilized crystalline form of boron phosphide and an oxy-hydrogen flame directed intermittently against the crystalline product does not cause any appreciable oxidation.

The inert character of stabilized crystalline boron phosphide as well as its high temperature stability, makes this a useful material in the fabrication of rocket and jet fittings and hardware. Examples of some of the parts which can thus be fabricated from crystalline boron phosphide include corrosion-resistant combustion chambers and liners for various vessels, including fuel tanks which are to be used to store both liquid and solid propellant fuels and oxidants, including ammonium perchlorate, fuming nitric acid and alkyl boron compounds, such as ethyl alkylated pentaborane and ethyl alkylated decaborane. Missile elements which must withstand extreme abrasion and high temperature shock may also be manufactured from crystalline boron phosphide; examples of such fittings include nose cones and rocket nozzles. Other hardware items which must withstand the abrasion of high temperature gas streams and are therefore preferably made from stabilized crystalline boron phosphide include jet elevators (also called jetevators) and other jet vanes, elevators and control surfaces. It is an advantage that curved shapes may readily be manufactured in a form which is characterized by high strength. The formation of the crystalline modification of stabilized boron phosphide results in the production of a gross structure of the particles to provide interlocking of the crystallites. This is particularly advantageous in the fabrication of curved shapes since the interlocking of the crystallites results in the production of a smooth curved surface. This effect is advantageous in the fabrication of parts which must undergo great thermal stress and shock, for example, in the nose cones of rockets and missiles. The present type stabilized crystalline boron phosphide has also been found to be stable to combustion gases without appreciable attack on the boron phosphide. Therefore, the curved shapes which are made from stabilized boron phosphide are especially advantageous as combustion chambers and throats in which a rocket fuel, for example diborane and an oxidizing agent such as fuming nitric acid, are co-mingled in order to provide a controlled combustion which releases a very large amount of energy, such as in the propulsion of a rocket.

Since stabilized crystalline boron phosphide is also a very hard material having a hardness of Moh's scale of 9 or more (diamond=10), this material is particularly suitable for the manufacture of impellers for fuel pumps in missiles, rockets and space ships and other moving parts. Stabilized crystalline boron phosphide is also a very light material, having a particle density of 2.94 (theoretical, 2.97).

The high temperature stability of stabilized crystalline boron phosphide makes this material particularly valuable in the fabrication of parts for turbines, including both combustion turbines and steam turbines. Specific parts thus contemplated include the nozzles for either a steam or combustion gas stream (the latter possibly including fly ash and metallic particles therein) and also the turbine blades, vanes, and bearings.

The inert character of stabilized crystalline boron phosphide in corrosive atmospheres makes this material a valuable source for the manufacture of steam jet ejectors and rupture discs which must maintain their form and strength at a constant value despite exposure to corrosive atmospheres, such as in petroleum refining.

Because of the hardness of stabilized crystalline boron phosphide, this material is especially adapted for use as an abrasive material or cutting tool, either in the form of a finely-divided product or in a fabricated form, for example as a cutting tool in a lathe. The particulate form of stabilized crystalline boron phosphide may also be used in the manufacture of grinding tools or wheels in which the particles are secured in a resinous binder. The finely-divided form of stabilized crystalline boron phosphide, because of its abrasive character, is also suitable for use in the manufacture of sand paper and other abrasive products. In this relationship the crystalline material is secured to a backing of paper, cloth, etc. by the use of a suitable glue, cement or resin. Another application for the stabilized crystalline boron phosphide arising from its wear-resistant properties is as wear plates, for example in grinders and crushers intended for size reduction of minerals, rocks, etc. and in the grinding of pulp wood in the production of paper.

The chemical inertness and high temperature stability of stabilized crystalline boron phosphide makes this a valuable material in the fabrication of chemical apparatus, such as crucibles and reactors intended particularly for use at high temperatures, since this material is resistant against temperatures of up to 6,000° F. Agitator arms may also suitably be fabricated from this material and burners such as in the manufacture of acetylene from natural gas, phosphorus pentoxide from phosphorus are typical examples of elements which may be fabricated from the crystalline form of boron phosphide. Such burners may also be made in the form of heat exchangers, since it is well known that burners must operate at very high temperatures because of the radiation effects such as in the combustion of elemental phosphorus to phosphorus pentoxide by air or oxygen.

Another field of application of the crystalline form of stabilized boron phosphide is as a nuclear reactor shield in the operation of atomic piles and other reactors in the field of atomic energy.

An unusually effective field of utilization of the optical characteristics of stabilized crystalline boron phosphide is an optical window in test instruments and in guided missiles and space ships. Such a window may also be fabricated with an external boron phosphide protective layer deposited upon a base of quartz or other transmissive material. It has been found that the cubic crystalline form of boron phosphide is characterized by an unexpected transmissive power for radiation of characteristic wave lengths (such as from about 1,850 Angstroms to about 8,000 Angstroms). This permits the fabrication of a window which is to be subjected to high temperature and high pressure conditions, for example as an observation port in a furnace or nuclear reactor or as an observation port for a space ship or missile which is intended to approach quite close to the sun or other stars. In this relationship, it is thus possible to pass the desired characteristic band of radiation through the window of crystalline boron phosphide while at the same time providing for the maintenance of erosion resistance of such a window even when it is subjected to an ambient temperature of 5,000° F. or 6,000° F.

Another field of utilization of stabilized crystalline boron phosphide is as a radiation meter. The imposition of certain specific bands of strong radiation upon the cubic crystalline form of boron phosphide results in the characteristic electrical modification of the material which is readily measured by conventional electrical procedures. Thus, it is possible to provide a radiation meter which can withstand extreme conditions of strong radiation, for example in a nuclear reactor, together with high temperature and pressure without failure of the meter element.

Since the cubic crystalline form of stabilized boron phosphide may be fabricated in order to achieve both dense (e.g. nearly theoretical density) and porous surfaces, a number of fields of application are based upon this property. For example, the dense form of stabilized crystalline boron phosphide may be used to fabricate a solid nose cone of needle form or blunt form intended for a guided missile. This stabilized crystalline boron phosphide is highly resistant against heating and thus withstands the attack by erosive gases to which a missile nose cone is subjected upon re-entry into the atmosphere. Under such conditions, speeds of up to 25,000 miles per hour may be encountered, together with surface temperatures in the order of 10,000° F. or above, and it is consequently imperative that a thermally stable material be available for this application, even though the extreme conditions may exist for only a short time, such as about 30 seconds.

A number of fabrication methods are available to produce the above-described manufactured products from crystalline stabilized boron phosphide. If it is desired to employ the stabilized crystalline material in powder form, one of the desirable methods is the hot pressing technique in which the stabilized powder, particularly when containing added boron, or boron and boron compounds resulting from the thermal treatment which may volatilize off some phosphorus, is placed in a die of the desired form and subjected to an elevated temperature, for example from 1,000° F. to 6,000° F. for a sufficient time to consolidate the stabilized crystalline material and effect sufficient sintering to achieve the desired density. The pressure is generally from 500 to 20,000 p.s.i. A flux or bonding agent may also be employed in this relationship; suitable materials for this purpose include one or more of the metals: boron, iron, nickel, cobalt, chromium, niobium, tantalum, titanium, zirconium, tungsten, molybdenum and hafnium; and the oxides alumina, zirconia, hafnia, silica, beryllia, titania, thoria, as well as combinations of the oxides and combinations with the said metals. Inorganic compounds having fluxing or bonding properties, such as the borates or phosphates, e.g., the alkali borates and phosphates may also be employed. Boron phosphate may also be employed as a bonding agent which forms a glassy matrix having the property of securing the crystalline particles of stabilized boron phosphide. Another additive which may be employed in the pressing operation is asbestos, since it has been found that when the composite article is later subjected to a vacuum heating or oxidizing condition, such as a combustion gas flame at about 6,000° F., the asbestos is burned out or fused, leaving the stabilized crystalline boron phosphide which is of utility in the use of sweat or transpiration cooling. This method is employed for cooling missile, rocket or space ship external and internal surfaces which are subjected to high temperatures. The porous objects having a wall of stabilized crystalline boron phosphide permit the exudation of a liquid, such as water, alcohol or the liquid fuel through the porous wall so that the liquid, upon passing through the porous stabilized boron phosphide is evaporated to provide an unusually efficient cooling effect.

The above-described porous form of fabricated stabilized boron phosphide is also of utility as a filter element, particularly for corrosive uses. Thus, in the fuel system for a rocket or missile, it is necessary to filter the fuel and/or oxidizing agent in order to avoid clogging the line. This presents a difficult problem in the case of corrosive agents, such as fuming nitric acid which attacks most metals. However, when a porous stabilized boron phosphide filter is inserted in the fuel or oxidant line, this filtering effect is readily accomplished without the danger of corrosion or dissolution of the stabilized crystalline boron phosphide.

In the hot pressing operation it may also be desirable to control phase changes of the stabilized boron phosphide by the use of specific additives. For example, transition temperature changes may be controlled by the addition of silicon carbide, zinc oxide and other crystalline materials to aid in the pressing operation.

Cold pressing or indenting of the stabilized crystalline boron phosphide is another fabrication method which may be employed, particularly with the use of a binder such as sodium silicate for the fabrication of various parts and fittings. The pressure utilized may be up to 200,000 p.s.i. Suitable metallic additives which may be employed, together with the stabilized crystalline boron phosphide include iron, nickel, cobalt, chromium, niobium, tantalum, titanium, zirconium, tungsten, molybdenum and hafnium; while refractory and insulating oxides, such as alumina, zirconia, hafnia, silica, beryllia, titania, thoria may also be employed singly or in combination, including combinations with the said metals. The cold pressed material is subsequently treated in various ways, such as by sintering, reducing or partially oxidizing the fabricated article, in which case the stabilized boron phosphide may also undergo a number of controlled modifications. The use of partial oxidation of the cold pressed material also permits the development of porosity, such as by the employment of additives exemplified by naphthalene and other organic compounds as well as cork and asbestos, since the heating and oxidation results in the burning out or transformation of such binder constituents to a glassy or crystalline matrix, which together with the change in the said metals or oxide constituents serves to secure and bond the stabilized boron phosphide particles.

If a minor proportion of elemental boron is employed as an additive with the stabilized crystalline boron phosphide in either hot pressing or cold pressing, the fabricated part may be subjected to a phosphorization treatment in which the piece is subjected to the vapor of elemental phosphorus or another phosphorus compound, for example phosphine, in order to consolidate the fabricated part with the transformation of the boron binding agent to boron phosphide.

If it is desired to make use of the cubic crystalline form of stabilized boron phosphide as a hardening element in a metallic base, for example, iron in the production of wear plates, the boron phosphide may be produced directly in such a metallic matrix. The base metals which may be employed in this relationship include the group of aluminum, magnesium, copper, titanium, chromium, manganese, vanadium, zirconium, molybdenum, tantalum, thorium, iron, nickel, lead tin, antimony, bismuth and zinc. Articles of this type are useful to withstand wear and abrasion such as in the manufacture of a chute for a sand or other minerals. Another use for such a reinforced metal is as a baffle in a steam turbine. The above-described process for the reaction of a phosphorus source such as ferrophosphorus and a boron source, such as ferroboron at elevated temperature results in the production of the desired cubic crystalline form of boron phosphide which is obtained in dispersed form in the iron matrix.

Pack diffusion is another method for applying stabilized crystalline boron phosphide to desired metallic or ceramic parts. In this method, particles of the stabilized crystalline boron phosphide are packed around the desired metallic or ceramic parts and the entire mixture subjected to a high temperature, e.g., about 1,500° F. to 6,000° F. for a suitable period of time to enable diffusion of the stabilized boron phosphide to take place into the desired parts and fittings.

If it is desired to coat or plate the stabilized crystalline boron phosphide on various substrates of metal or refractory parts, particularly when intricate sections are involved, a flame spraying technique is desirable. In this method, a high temperature flame such as a reducing oxy-hydrogen flame is provided with finely-divided particles of stabilized crystalline boron phosphide or of unstabilized material, which becomes stabilized in its passage through the flame. The impingement of the flame upon the desired prototype base parts of metal or refractory coats the parts with a uniform and dense deposit of the stabilized crystalline boron phosphide.

Intermediate layers of various metals may also be employed in coating base materials. For example, an article of molybdenum may be first coated with metallic nickel, such as by electro-plating. A final external coating of boron phosphide is then applied as an outer protective layer. In this way, it is possible to apply any desired intermediate metals or non-metals to provide graduated properties of thermal expansion, porosity sealing, etc.

Another method which may be applied is the deposition of a coating of stabilized crystalline boron phosphide by electrophoresis. This method is particularly suited for precision coating of complicated shapes. Metals and oxides selected from the group consisting of iron, nickel, cobalt, chromium, niobium, tantalum, titanium, zirconium, tungsten, molybdenum and hafnium; and the oxides alumina, zirconia, hafnia, silica, beryllia, titania, thoria, as well as combinations of the oxides and combinations with the said metals may also be applied in combination with the crystalline boron phosphide by the electrophoretic method. In this process an aqueous suspension of the stabilized crystalline boron phosphide and the desired metal or oxide is prepared, preferably with particle size ranges of from 1 to 10 microns. A suspending or dispersing agent such as carboxymethylcellulose may also be present. The suspension preparation is then deposited upon the prototype of graphite, a metal or a fine screen metal form utilizing a plating voltage of the order of 6 to 100 volts direct current. A uniform coating of the stabilized boron phosphide, optionally with a metal and oxide therewith of the group set forth above is thus applied to the base prototype. The coating is subsequently air dried and is then treated by a low temperature hydrogen reduction in the case of the metallic oxides. Hydrogen reduction is not necessary with coatings of the metal powders, and the stabilized boron phosphide is unaffected by such treatment.

The electrophoretic coating is next densified by peening, rolling or by isostatic pressing, the latter method being particularly convenient for small items. A final step after densification is a sintering of the coating to provide a uniform and strong coating which is resistant to chemicals and to abrasion.

A mechanical method of deposition which is available for the fabrication of external layers of stabilized crystalline boron phosphide is that of slurry deposition. In this method the finely-divided stabilized crystalline boron phosphide is dispersed in a liquid vehicle such as water, optionally with a dispersing or suspending agent such as carboxymethylcellulose. Additive materials, such as metals, for example iron, nickel, cobalt, chromium, niobium, tantalum, titanium, zirconium, molybdenum and hafnium and finely-divided refractories, e.g., alumina, zirconia, hafnia, silica, beryllia, titania, and thoria may also be present.

The forms upon which the slurry is to be deposited are made with a porous structure, for example from metal powders which have been loosely consolidated to the desired shape or by the use of a fine mesh screen form having the shape of the desired object. Such a porous prototype is suspended in the liquid vehicle which is then subjected to high pressures of the order of 10,000 to 50,000 pounds per square inch. Provision is made for the liquid vehicle to be removed from the interior of the mold or prototype piece which may have an intricate form, or may consist of a simple flat plate as may be desired. As a result of the imposition of pressure upon the dispersion of the stabilized crystalline boron phosphide, the slurry is uniformly pressed against the prototype with the result that an interlocking crystalline structure is obtained without internal voids or bridges. When the desired thickness of stabilized crystalline boron phosphide has thus been formed, the coating may be subjected to further mechanical treatment. For example, the coating thus obtained by slurry dispersion may be densified by peening, rolling or isostatic pressing. Finally the deposited coating of crystalline boron phosphide, together with any additives is sintered to consolidate the coating to a dense form.

Another method of fabrication which is of utility in forming bodies from stabilized crystalline boron phosphide is the slip casting technique. In this method a slurry is made of the crystalline stabilized boron phosphide, together with any desired additive material, such as finely-divided refractories, e.g., alumina, zirconia, hafnia, silica, beryllia, titania, and thoria. This mixture is then used in conventional ceramic slip casting techniques to obtain the desired shapes and fittings in a green form which is then fired, packed or sintered to consolidate the crystalline particles.

The present patent application includes subject matter specifically claimed in copending application Serial No. 691,158, filed October 21, 1957.

What is claimed is:

1. Process for stabilizing crystalline boron phosphide against oxidative deterioration in the temperature range of from 2,000° F. to 2,500° F., which comprises subjecting the said crystalline boron phosphide to an oxidizing atmosphere selected from the group consisting of air, oxygen, and oxygen enriched air at a temperature above 3,600° F. but below 5,000° F.

2. Process for stabilizing crystalline boron phosphide against oxidative deterioration in the temperature range of from 2,000° F. to 2,500° F., which comprises subjecting the said crystalline boron phosphide to an oxidizing atmosphere selected from the group consisting of air, oxygen, and oxygen enriched air at a temperature above 3,600° F., but below 5,000° F. for a period of time of from 15 seconds to 30 minutes.

3. Process for stabilizing crystalline boron phosphide against oxidative deterioration in the temperature range of from 2,000° F. to 2,500° F., which comprises subjecting the said crystalline boron phosphide in admixture with from 1% to 60% by weight of silicon in an oxidizing atmosphere selected from the group consisting of air, oxygen, and oxygen enriched air at a temperature above 3,600° F., but below 5,000° F. for a period of time of from 15 seconds to 30 minutes.

4. An article of manufacture comprising a shaped object of crystalline boron phosphide having an external coating resulting from the treatment of the said object in an oxidizing atmosphere selected from the group consisting of air, oxygen, and oxygen enriched air at a temperature of at least 3,600° F. but below 5,000° F.

5. An article of manufacture comprising discrete particles of crystalline boron phosphide having an external coating of a fused, glassy mixture of oxidation products resulting from the oxidation of the said particle in an oxidizing atmosphere selected from the group consisting of air, oxygen, and oxygen enriched air at a temperature of from 3,600° F. to 5,000° F.

6. An article of manufacture comprising a shaped object of crystalline boron phosphide having an external coating composed of a fused layer of the reaction products of silicon and the oxidation products of the said crystalline boron phosphide subjected to an oxidizing atmosphere selected from the group consisting of air, oxygen, and oxygen enriched air at a temperature of from 3,600° F. to 5,000° F.

7. An article of manufacture comprising a discrete particle of crystalline boron phosphide having an external coating comprising the fusion product of silicon, together with the oxidation products of the said crystalline boron phosphide when subjected to an oxidizing atmosphere selected from the group consisting of air, oxygen, and oxygen enriched air at a temperature of from 3,600° F. to 5,000° F.

8. An article of manufacture comprising crystalline boron phosphide having an external coating comprising the fusion product selected from the group consisting of boron, potassium, sodium, magnesium, barium, calcium, silicon, chromium, molybdenum, aluminum, zirconium, titanium, and the oxides of potassium, sodium, magnesium, barium, molybdenum, aluminum, zirconium, titanium, hafnium, thorium, and beryllium, together with the oxidation products of the said crystalline boron phosphide when subjected to an oxidizing atmosphere selected from the group consisting of air, oxygen, and oxygen enriched air at a temperature of from 3,600° F. to 5,000° F.

9. The process for stabilizing crystalline boron phosphide against oxidative deterioration at a temperature range of from 2,000° F. to 2,500° F. which comprises admixing and contacting the said crystalline boron phosphide with a stabilizing agent selected from the group consisting of boron, potassium, sodium, magnesium, barium, calcium, silicon, chromium, molybdenum, aluminum, zirconium, titanium, and the oxides of potassium, sodium, magnesium, barium, molybdenum, aluminum, zirconium, titanium, hafnium, thorium and beryllium, in the proportion of from 1% to 60% by weight of the said stabilizing agent relative to the weight of the crystalline boron phosphide, and oxidizing the mixture of the crystalline boron phosphide with the said stabilizing agent in an oxidizing atmosphere selected from the group consisting of air, oxygen, and oxygen enriched air at a temperature above 3,600° F. but below 5,000° F. for a period of time of from 15 seconds to 30 minutes.

10. The process for fabricating a shaped article from stabilized crystalline boron phosphide which comprises admixing particulate crystalline boron phosphide with from 1% to 60% by weight of a particulate stabilizing agent selected from the group consisting of boron, potassium, sodium, magnesium, barium, calcium, silicon, chromium, molybdenum, aluminum, zirconium, titanium, and the oxides of potassium, sodium, magnesium, barium, molybdenum, aluminum, zirconium, titanium, hafnium, thorium and beryllium, forming the mass of articles into the desired shape, and thereafter heating with said mass in an oxidizing atmosphere selected from the group consisting of air, oxygen, and oxygen enriched air at a temperature above 3,600° F. but below 5,000° F. for a period of time sufficient to consolidate the articles into the desired shaped article.

11. The process for fabricating a shaped article from stabilized crystalline boron phosphide which comprises admixing particulate crystalline boron phosphide with from 1% to 60% by weight of potassium oxide as a stabilizing agent, forming the mass of particles into the desired shape, and thereafter heating the said mass in an oxidizing atmosphere selected from the group consisting of air, oxygen, and oxygen enriched air at a temperature above 3,600° F. but below 5,000° F. for a period of time sufficient to consolidate the particles into the desired shaped article.

12. The process for stabilizing crystalline boron phosphide which comprises admixing and contacting crystalline boron phosphide with potassium oxide and thereafter heating the said mixture in an oxidizing atmosphere selected from the group consisting of air, oxygen, and oxygen enriched air at a temperature above 3,600° F. but below 5,000° F. for a period of time sufficient to stabilize the said crystalline boron phosphide.

References Cited in the file of this patent

UNITED STATES PATENTS

| | | |
|---|---|---|
| 2,741,822 | Udy | Apr. 17, 1956 |
| 2,839,413 | Taylor | June 17, 1958 |